March 28, 1967 R. A. WILLIAMS 3,311,316

ENDLESS LOOP TAPE CARTRIDGE

Filed Jan. 8, 1964

INVENTOR.
RICHARD A. WILLIAMS

BY Lyon & Lyon

ATTORNEYS

United States Patent Office 3,311,316

Patented Mar. 28, 1967

3,311,316

ENDLESS LOOP TAPE CARTRIDGE

Richard A. Williams, Sepulveda, Calif., assignor to Stori-Corder Company, Santa Monica, Calif., a corporation of California Filed Jan. 8, 1964, Ser. No. 336,427
7 Claims. (Cl. 242—55.19)

This invention relates to tape recorders and more particularly relates to an endless loop tape cartridge for use in recording and reproducing sound.

There is at the present time a growing demand for magnetic tape recorders having relatively small physical dimensions but with reasonably long recording and playback capacities. For example, portable magnetic tape recorders and recorders that can be incorporated into toys such as dolls are quite popular. In order to reduce the size of these recorders, most suppliers have utilized cartridges of the endless loop type that can be easily inserted into and removed from a housing of some sort containing the recording and reproducing equipment. While the use of endless loop tape cartridges provides a great space saving and eliminates the need for rewinding, it also raises many problems that are inherent in the nature of the cartridges.

The basic necessity in the operation of an endless loop tape cartridge is inter-leaf slippage. The tape must slip upon itself to compensate for the differences in the diameter where the tape comes on to where the tape is pulled out of the cartridge. Although for a given length of tape friction is the same, the lateral movement of the tape from the outer periphery of the cartridge turntable to its hub, together with the tape sliding upon itself creates a problem of uneven tensions on the tape. Because of the unequal tensions that are exerted on the tape as it is pulled off the turntable, the tape will tend to climb in the direction of the greatest tension, that is, toward the hub. The result is telescoping of the tape and a jam within the cartridge. If the tape were to slip freely, it would not have unequal tensions to the degree that would cause the tape to move in any direction except around the hub and eventually around the loop.

Another problem relating to the use of an endless loop tape cartridge is that of engaging the tape with a capstan for driving it past the recording or reproducing pickup head. In the conventional cartridge, the capstan is slipped into the cartridge by either raising the tape or through some mechanical means. A pinch roller is then moved against the capstan to create enough pressure to drive the tape from the cartridge past the pickup head. Both of these methods are inconvenient and require space for manipulation or additional equipment.

It is therefore an object of the present invention to provide an improved endless loop tape cartridge for magnetic tape recorders.

It is also an object of the present invention to provide such a cartridge which will hold a greater amount of tape for its size than those heretofore available.

It is another object of the present invention to provide such a cartridge in which the tape slips freely from the outer periphery of the cartridge turntable to its hub.

It is a further object of the present invention to provide such a cartridge in which the engagement of the tape with the driving capstan is simple and direct.

These and other objects and advantages of the present invention will become more apparent upon reference to the accompanying detailed description and drawings in which.

Figure 1:
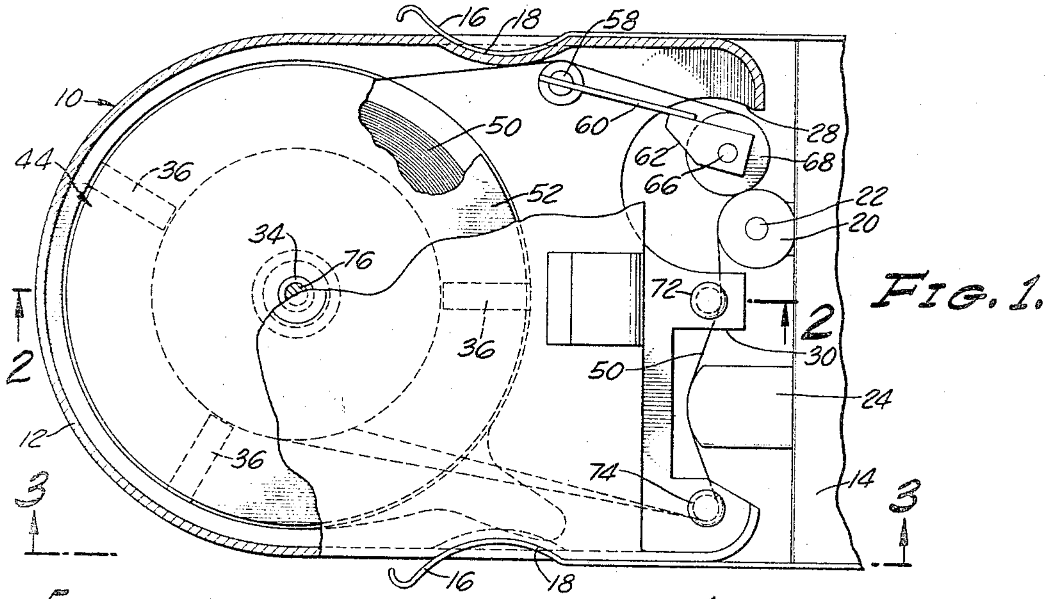
FIGURE 1 is a top plan view, partly in section and partly broken away, of the cartridge of the present invention in engagement with recording or playback apparatus.

Referring now to the several figures, the cartridge, generally indicated at 10, has a housing 12 which is adapted to be connected to a recording and playback assembly 14 by means of spring clamps 16 mounted on the assembly 14. The spring clamps 16 cooperate with notches 18 formed in the housing 12 for this purpose. The recording and playback assembly 14 is provided with a driving capstan 20 mounted on a drive shaft 22 for driving the tape and a record/pickup head or transducer 24 for engagement with the tape.

The base of the housing 12 is provided with first and second cut-out portions 28 and 30 into which the capstan 20 and head 24 are inserted when the housing 12 is engaged with the assembly 14. The base of the housing 12 is also provided with an aperture 32 in which is mounted a hollow shaft 34. The base of the housing 12 is further provided with a plurality of raised radial ribs 36 each of which is capped by a strip 38 of low friction coefficient material such as polytetrafluoroethylene.

A turntable 44 is mounted in inverted or upside down fashion on the shaft 34. The turntable is perferably formed of a suitable plastic and is provided with a hub 46 having an outwardly tapering peripheral surface 48. The lowermost portion of the hub 46 is positioned between the inner ends of the ribs 36; the maximum radius of the hub 46 being slightly less than the radial distance from the axis of rotation of the turntable to the inner end of each of the ribs 36. An endless magnetic tape 50 is wound on the hub 46 and rests on the base portion 52.

A pin 58 is mounted on the base of the housing 10 and has mounted thereon a leaf spring 60. The outer end of the leaf spring 60 is provided with flanges 62 and 64 which support a shaft 66 on which is rotatably mounted a pinch roller 68. The leaf spring 60 is positioned so that the pinch roller 68 will be moved against the capstan 20 to create sufficient pressure to pull the tape through the cartridge when the cartridge is inserted into the assembly 14.

The base of the housing 12 is also provided with a pair of guide posts 72 and 74 for guiding the movement of the tape 50 and holding it against the pressure of the capstan 20 and head 24. The pins 72 and 74 must be mounted as close to the vertical as possible, as must the leaf spring 60 on the pin 58 so that an even pressure will be exerted across the width of the tape 50. A pin 76 may be used to hold the cover and base portions of a housing 12 together.

When a message is to be recorded on or played back from the tape 50, the cartridge 10 is inserted into the assembly 14 until the spring clamps 16 are positioned in the notches 18. At this point, the capstan 20 will have displaced the pinch roller 68 somewhat from its normal position so that a sufficient pressure is exerted on the tape 50 to cause it to be driven by the capstan 20. The head 24 is also in firm engagement with the portion of the tape 50 between the guide pins 72 and 74. As can be seen, it is not necessary to device any complicated manual or mechanical procedure for engaging the capstan in driving relationhip with the tape when the cartridge is constructed in the manner shown and described.

Figures 2, 3:
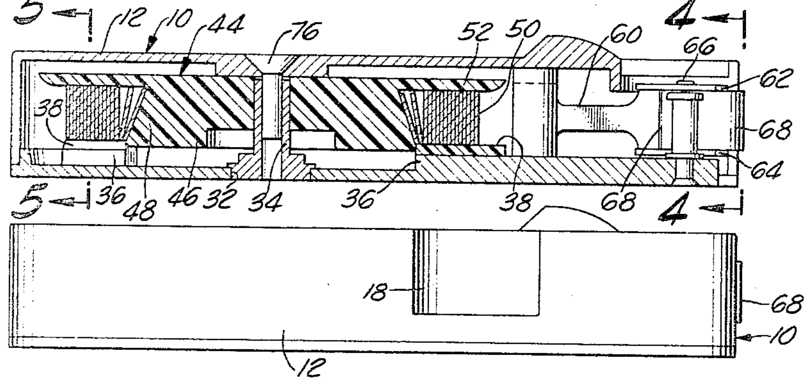
FIGURE 2 is a sectional view taken along lines 2—2 of FIGURE 1.
FIGURE 3 is a view taken along lines 3—3 of FIGURE 1.
Figures 4, 6:
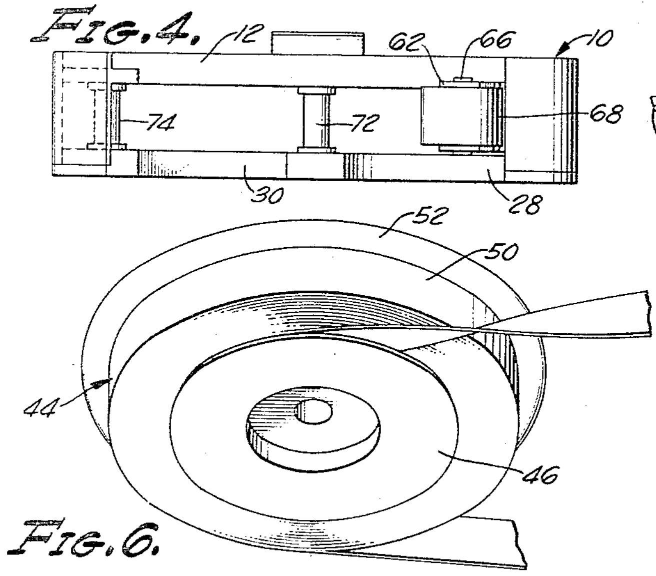
FIGURE 4 is a view taken along lines 4—4 of FIGURE 2.
FIGURE 6 is a perspective view of the turntable of the cartridge of the present invention.
Figure 5:
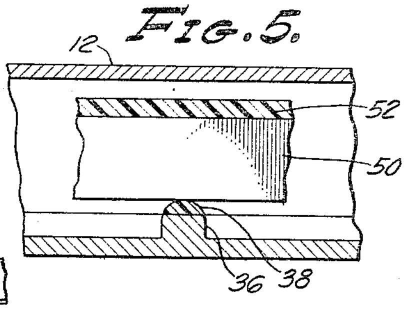
FIGURE 5 is sectional view taken along lines 5—5 of FIGURE 2.

The inverted or upside down mounting of the turntable together with the provision of the ribs 36 greatly enhances inter-leaf slippage and thus reduces or eliminates the possibility of tape telescoping or jamming. As can best be seen in FIGURES 2 and 5, the tape 50 is firmly confined between the base portion 52 of the turntable 44 and the ribs 36. Since the friction coefficient of these members is very low, the tape is able to slip laterally from the point on the outer periphery of the turntable where it is taken in to the hub 46 from whence it is drawn out. Since differences in tape tension have been greatly reduced, the tape does not have as great a tendency to telescope or move in any direction except to rotate around the turntable and slide toward the hub. Moreover, because of the inverse mounting of the turntable, the tape has no chance to follow such unwanted tendencies if they occur, as the base portion 52 of the turntable 46 rests on the entire upper surface of the tape and leaves no room for climbing or telescoping.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An endless loop tape cartridge comprising: a housing having a base portion and a cover portion; a shaft vertically mounted on said base portion; a plurality of radial ribs formed on said base portion around said shaft, the inner ends of said ribs being spaced from said shaft; and a turntable having a base portion and a hub portion and having said endless loop tape wound thereon, said turntable being rotatably mounted on said shaft with said hub portion downward and said base portion upward, a portion of said hub portion being positioned between the inner ends of said ribs and closely adjacent thereto; said base portion of said turntable and said ribs restraining said tape against movement other than rotational movement around said turntable and sliding movement on said ribs toward said hub portion.

2. The cartridge of claim 1 wherein said base portion of said turntable and a portion of said ribs are made of materials having a low coefficient of friction.

3. An endless loop tape cartridge comprising: a housing having a base and a cover; a shaft vertically mounted on said base; a plurality of radial ribs formed on said base around said shaft, the inner ends of said ribs being spaced from said shaft, the upper surfaces of said ribs having a low coefficient of friction; and a turntable having a base portion and a hub portion, said hub portion being tapered outwardly from said base portion and having said endless loop tape wound thereon, the maximum radius of said hub portion being slightly smaller than the space between the inner ends of said ribs and said shaft, said turntable being rotatably mounted on said shaft with said hub portion downward and said base portion upward, the lowermost portion of said hub portion being positioned between the inner ends of said ribs and closely adjacent thereto; said base portion of said turntable and said ribs restraining said tape against movement other than rotational movement around said turntable and sliding movement on said ribs toward said hub portion.

4. An endless loop tape cartridge comprising: a housing having a base and a cover, said base having a cut-out portion at one end thereof; a shaft mounted on said base; a leaf spring mounted on said base adjacent said cut-out portion; a pinch roller mounted on said leaf spring and positioned over said cut-out portion; a plurality of radial ribs formed on said base around said shaft; and a turntable rotatably mounted on said shaft and having said endless loop tape wound thereon, said turntable having a base portion and a hub portion extending to a point intermediate of and closely adjacent to the inner ends of said ribs, said turntable being mounted on said shaft with said hub portion downward and said base portion upward; said base portion of said turntable and said ribs restraining said tape against movement other than rotational movement around said turntable and sliding movement toward said hub portion.

5. An endless loop tape cartridge comprising: a housing having a base and a cover, said base having a cut-out portion at one end thereof; a shaft vertically mounted on said base portion; a leaf spring mounted on said base adjacent said cut-out portion; a pinch roller mounted on said leaf spring and positioned over said cut-out portion; a plurality of radial ribs formed on said base portion around said shaft, the inner ends of said ribs being spaced from said shaft; and a turntable having a base portion and a hub portion and having said endless loop tape wound thereon, said turntable being rotatably mounted on said shaft with said hub portion downward and said base portion upward, a portion of said hub portion being positioned between the inner ends of said ribs; said base portion of said turntable and said ribs restraining said tape against movement other than rotational movement around said turntable and sliding movement on said ribs toward said hub portion.

6. An endless loop tape cartridge comprising: a housing having a base and a cover, said base having a cut-out portion at one end thereof; a shaft vertically mounted on said base; a leaf spring mounted on said base adjacent said cut-out portion; a pinch roller mounted on said leaf spring and positioned over said cut-out portion; a plurality of radial ribs formed on said base around said shaft, the inner ends of said ribs being spaced from said shaft, the upper surfaces of said ribs having a low coefficient of friction; and a turntable having a base portion and a hub portion, said hub portion being tapered outwardly from said base portion and having said endless loop tape wound thereon, the maximum radius of said hub portion being slightly smaller than the space between the inner ends of said ribs and said shaft, said turntable being rotatably mounted on said shaft with said hub portion downward and said base portion upward, the lowermost portion of said hub portion being positioned between the inner ends of said ribs; said base portion of said turntable and said ribs restraining said tape against movement other than rotational movement around said turntable and sliding movement on said ribs toward said hub portion.

7. The cartridge of claim 6 wherein said base is provided with a second cut-out portion at said end thereof and a pair of guide posts on either side of said second cut-out portion, said endless loop tape being drawn from adjacent said hub portion of said turntable between two of said ribs, passed around said guide posts and said pinch roller, and rewound on the outer periphery of said turntable.

References Cited by the Examiner

UNITED STATES PATENTS

| | | | |
|---|---|---|---|
| 1,825,142 | 9/1931 | Bruno | 242—55.19 X |
| 2,325,563 | 7/1943 | Westerkamp | 242—55.19 |
| 2,778,637 | 1/1957 | Eash | 242—55.19 |
| 2,791,423 | 5/1957 | Eddy | 242—55.19 |
| 3,025,012 | 3/1962 | Fries | 242—55.19 |
| 3,032,613 | 5/1962 | Mamenyi-Katz | 242—55.13 X |
| 3,065,310 | 10/1962 | Cross | 242—55.19 X |

FRANK J. COHEN, *Primary Examiner.*

MERVIN STEIN, *Examiner.*

B. S. TAYLOR, *Assistant Examiner.*